United States Patent Office 3,212,565
Patented Oct. 19, 1965

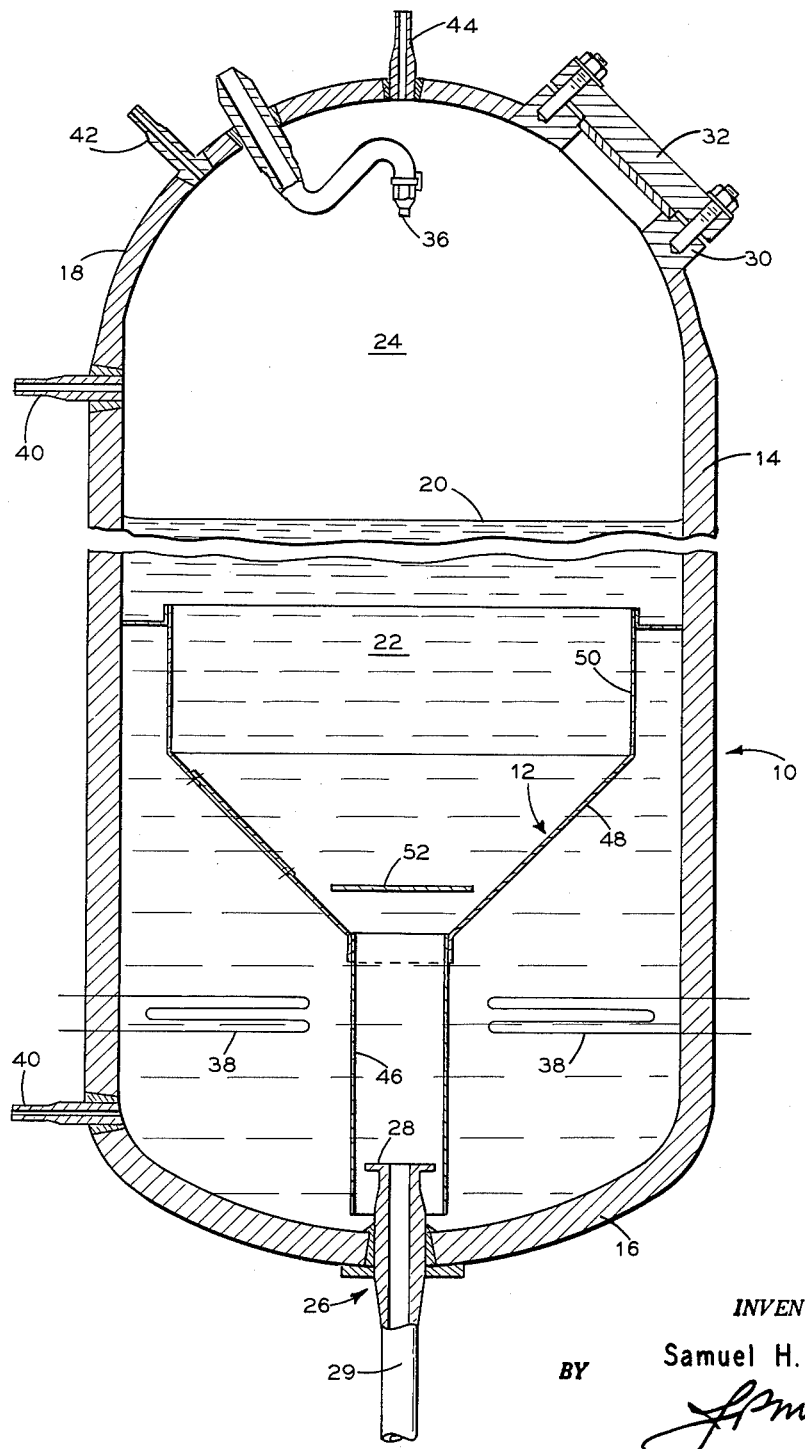

3,212,565
INSURGE CONTAINER BAFFLE
Samuel H. Esleeck, Lynchburg, Va., assignor to The Babcock & Wilcox Company, New York, N.Y., a corporation of New Jersey
Filed Dec. 12, 1962, Ser. No. 244,197
9 Claims. (Cl. 165—58)

This invention relates in general to an insurge container baffle and more particularly to an insurge baffle for use in a surge tank in connection with a closed or self-contained fluid system. The function of the baffle is to inhibit the rapid mixing of the insurging fluid entering the surge tank with the fluid already contained within said surge tank so that, should an outsurge occur immediately after the aforementioned insurge, the effluent returned to the fluid system will consist essentially of the fluid which recently had comprised the insurging fluid. The insurge baffle in accordance with this invention comprises a plate means forming a tube-like member surrounding the end of the surge line in the surge tank and a second baffle member disposed opposite the end of the surge line and cooperating with the tube-like member to dissipate the kinetic energy of the insurging fluid.

A surge tank is frequently used in connection with fluid systems to accommodate variations in the volume and/or pressure of the fluid contained therein. Oftentimes it is desirable or necessary to maintain the fluid within the surge tank under different pressure and temperature conditions than those existing in the main fluid system to which it is connected. The restricted circulation permitted by the comparatively small fluid flow area of the combined surge inlet and outlet line connecting the surge tank with the fluid system generally prevents any substantial degree of mixing between the two fluids, i.e. the fluid within the fluid system and the fluid retained in the surge tank. Under such circumstances it may be seen that should a transient condition in the main fluid system create a surge into the surge tank followed by an immediate outsurge, if the insurging fluid was permitted to thoroughly mix with the fluid already contained in the surge tank, the characteristics both of the fluid in the main system and the fluid in the surge tank would be significantly altered and unstable control and operation would result. On the other hand, if the insurging fluid may be momentarily isolated from the fluid in the surge tank, an immediate outsurge will withdraw primarily the same fluid which has just been introduced by the insurge so that the conditions of both the surge tank and the fluid system will not be too drastically affected.

One type of surge tank which involves this specific problem is a pressurizer as used in a pressurized water nuclear reactor system. In such a system it is desirable to maintain the system pressure within specified limits. This is accomplished by the use of a pressurizer which may be characterized as a combined surge tank and steam boiler having zero steam output. The pressurizer is connected to the primary coolant system of the nuclear reactor by a combined inlet and outlet surge line which transmits and maintains pressurization between the pressurizer and the coolant system. Steam generated within the pressurizer produces this pressure which is then transmitted to the primary coolant system through the surge line. In this way, the fluid within the pressurizer is maintained at a pressure-temperature relationship somewhat higher than that in the primary coolant system. The surge line is sized so that it will transmit pressure between the pressurizer and the primary coolant system and yet minimize the interchange of fluid therebetween except for surges of the coolant system fluid. In this way heat generated in the pressurizer is not lost by circulation of the pressurizer fluid into the lower temperature primary coolant system. Should the pressure in the reactor primary coolant system drop below a desired minimum value, heaters in the pressurizer are activated to generate steam to restore the system pressure to a value such that the saturation temperature of the primary coolant fluid is above the operating temperature of the reactor to prevent boiling in the reactor core. Conversely, should the system pressure rise above a predetermined maximum value, cooler water is injected into the steam space to cool the steam in the pressurizer and thus reduce the system pressure to the normal desired value.

It has been found in pressurized water reactor systems that certain power changes may subject the pressurizer to surge transients causing an insurge of relatively cooler fluid from the reactor primary system into the pressurizer followed immediately by an outsurge. In many cases the outsurge may be much larger than the preceding insurge, although they may both be of significantly large magnitude. In such a case the performance of the pressurizer may be drastically affected by the conditions existing therein after the insurge of the cooler water and before the succeeding outsurge. It has been found that if the cooler insurge water mixes thoroughly with the saturated water originally within the pressurizer, the succeeding outsurge will be at a higher temperature than the preceding insurge and will result in a reduction in the primary coolant system pressure. On the other hand, it has been found that if the insurge water can be kept substantially separate from the saturated water within the pressurizer, and further, if this cooler water is the first to leave the pressurizer on the succeeding outsurge, that the pressure decrease in the reactor coolant system will be minimized. The differences between the pressure transients just described may be as much as 200 to 300 p.s.i. and may mean the difference between operating success or failure of the reactor cooling system.

Accordingly, the present invention provides an insurge tank for use in a pressure system adapted to contain a body of fluid maintained at a temperature different than that in the fluid system and having a combined surge inlet and outlet line terminating in the lower portion of the tank and in communication with the fluid system, an insurge container baffle disposed in the tank and comprising plate means forming a tube-like member surrounding the end of the surge line and having one end terminating between the end of the surge line and the tank, and means disposed within said tube-like member opposite the end of the surge line to dissipate the kinetic energy of the insurging fluid.

The various features of novelty which characterize the invention are pointed out with particularity in the claims annexed to and forming a part of this specification. For a better understanding of the invention, its operating advantages and specific objects attained by its use, reference should be had to the accompanying drawing and descriptive matter in which there is illustrated and described a preferred embodiment of the invention.

The accompanying drawing shows a vertical section through a pressurizer 10 embodying the insurge container baffle 12 of the present invention. The pressurizer 10 comprises a pressure vessel having a vertically extending circular wall portion 14 closed at the ends by upper and lower heads 18 and 16, respectively. The pressure vessel is adapted to contain a body of vaporizable liquid having a liquid level 20 which divides the vessel volume into a lower liquid space 22 and an upper vapor space 24. While the location of the liquid level in the vessel may vary somewhat depending upon the temperature of the primary coolant system during operation, it would be controlled within predetermined limits. Disposed centrally of the bottom head 16 is a thermal sleeve connection 26 which extends into and has one end 28 communicating with the interior of the pressurizer 10 in the lower liquid space 22 while the other portion, extending exterior of the vessel, is attached to a combined inlet and outlet surge line 29 which connects with the primary coolant system (not shown).

A nozzle 30 is provided in the upper head 18 of the pressure vessel to form a manway opening, closed by member 32, giving access to the interior of the vessel. A spray means having a nozzle 36 is also provided through the upper head 18 and is adapted to introduce a coolant fluid into the vapor space 24 as will be further discussed. Heating means are provided in the liquid space 22 of the pressure vessel adapted to vaporize the liquid therein to generate steam to provide the pressure which is then imposed upon the pressurized liquid system through the surge line 29. The heating means may be, for example, immersion heaters 38 extending through the wall of the pressure vessel and connected to a suitable source of power (not shown). Connections are also provided through the pressure vessel wall for liquid level control 40, pressure measurement 42, and a safety valve 44.

For a more detailed disclosure of the construction, the arrangement and operation of a pressurizer of the type herein referred to, reference may be had to the common assignee's copending applications Serial Nos. 839,252 and 113,842.

The insurge container baffle 12 is disposed in the liquid space 22 and extends from nearly the bottom of the pressure vessel to substantially the normal liquid level 20. The baffle comprises a lower tube-like member 46 arranged co-axially with the end 28 of the surge line with one end extending thereover and terminating near the lower head 16 of the pressure vessel. The opposite or upper end of tube-like member 46 is connected to a frusto-conical transition piece 48 which extends upwardly and is connected to a co-axially disposed upper cylindrical member 50 which terminates below the normal liquid level 20. The insurge container baffle 12 thus encloses a portion of the liquid space 22 of the pressurizer immediately adjacent to and extending upwardly from the end 28 of the surge line. The construction of the container baffle 12 is such that it is open to and in communication with the liquid space of the pressurizer at its top and bottom extremities to permit a comparable rise or fall in liquid levels of both the insurge container and the pressurizer with a minimum of mixing between the two. A secondary baffle 52 is disposed within the insurge container baffle 12 as near to the end 28 of the surge line as practical, its purpose being to dissipate the velocity of the insurging liquid so as to minimize the mixing between that liquid and the liquid in the pressurizer. This baffle 52 may be either of a solid plate type providing an annular flow path between its periphery and the wall 48 of the insurge container baffle or it may be a perforated plate permitting passage of the fluid therethrough while still dissipating the insurging fluid velocity.

In operation, the insurge container baffle retains substantially all of the insurging liquid within a confined space so as to retard mixing with the liquid already contained within the pressurizer 10. Should an outsurge immediately follow the insurge, substantially the same fluid would be returned through the surge line 29 to the pressurized liquid system. As a result of the arrangement whereby the insurge container is open both at the top and bottom to the remainder of the liquid space of the pressurizer it is possible for the liquid within the container to be maintained at a uniform temperature to the remainder of the pressurizer during steady state operation. Thus, when an insurge occurs, with relatively cool fluid entering the pressurizer from the pressurized liquid system, not immediately followed by an outsurge, the cool fluid will eventually be heated to a uniform temperature by the mixing due to the natural circulation of the fluid through the liquid space and the insurge container.

Additionally, the insurge container baffle also acts to protect the pressure vessel walls, internals, and heaters from thermal shock as a result of contact with incoming cooler fluid thus providing increased reliability and safety during either type of system transient.

While in accordance with the provisions of the statutes there is illustrated and described herein a specific embodiment of the invention, those skilled in the art will understand that changes may be made in the form of the invention covered by the claims, and that certain features of the invention may sometimes be used to advantage without a corresponding use of the other features.

What is claimed is:

1. In a fluid system, a surge tank containing a body of fluid having a liquid level, said body of fluid being maintained at a temperature different than the temperature of the fluid in said fluid system, said system having a combined surge inlet and outlet line terminating in the lower portion of said tank and communicating with said fluid system, an insurge container baffle disposed in said tank and comprising means forming a tube-like member open at opposite ends arranged about the end of said surge line, one end of said tube-like member surrounding the end of said surge line and terminating between the end of said surge line and said tank, said one end of said tube-like member cooperating with the end of said surge line to form an annular flow passage therebetween, the opposite end of said tube-like member terminating subjacent said liquid level, and means disposed within said tube-like member opposite the end of said surge line to dissipate the kinetic energy of the insurging fluid to inhibit its mixture with the fluid contained in said surge tank.

2. In a fluid system, a surge tank containing a body of fluid having a liquid level, said body of fluid being maintained at a temperature different than the temperature of the fluid in said fluid system, said system having a combined surge inlet and outlet line terminating in the lower portion of said tank and communicating with said fluid system, an insurge container baffle disposed in said tank and comprising plate means forming a tube-like member open at opposite ends arranged co-axially about the end of said surge line, one end of said tube-like member surrounding the end of said surge line to form and annular flow passage therebetween and terminating between the end of said surge line and said tank, the opposite end of said tube-like member terminating subjacent said liquid level, and means disposed within said tube-like member opposite the end of said surge line to dissipate the kinetic energy of the insurging fluid to inhibit its mixture with the fluid contained in said surge tank.

3. In a fluid system, a surge tank containing a body of fluid having a liquid level, said body of fluid being maintained at a temperature different than the temperature of the fluid in said fluid system, said system having a combined surge inlet and outlet line terminating in the lower portion of said tank and communicating with said fluid system, an insurge container baffle disposed in said tank and comprising plate means forming a tube-like member open at opposite ends arranged co-axially about the end of said surge line, one end of said tube-like member surrounding the end of said surge line to form a restricted annular flow passage therebetween and terminating between the end of said surge line and said tank, the opposite end of said tube-like member terminating subjacent said liquid level, and a second baffle means disposed within said tube-like member opposite the end of said surge line and forming an annular flow passage between said second baffle member of said tube-like member to dissipate the kinetic energy of the insurging fluid to inhibit its mixture with the fluid contained in said surge tank.

4. In a pressurized liquid system, a pressurizer comprising a pressure vessel adapted to contain a body of vaporizable liquid having a liquid level separating a lower liquid space from an upper vapor space, said system having a combined surge inlet and outlet line terminating in the lower liquid space of said vessel and communicating with said pressurized liquid system, means for maintaining said liquid in said pressure vessel at a temperature different than the temperature of said liquid in said pressurized liquid system, an insurge container baffle disposed in said pressure vessel and comprising plate means forming a tube-like member open at opposite ends arranged co-axially about the end of said surge line, one end of said tube-like member surrounding the end of said surge line to form an annular flow passage therebetween and terminating between said end of said surge line and said pressure vessel, the opposite end of said tube-like member terminating subjacent said liquid level, and means disposed within said tube-like member opposite the end of said surge line to dissipate the kinetic energy of the insurging fluid to inhibit its mixture with the fluid contained in the pressure vessel.

5. In a pressurized liquid system, a pressurizer comprising a pressure vessel adapted to contain a body of vaporizable liquid having a liquid level separating a lower liquid space from an upper vapor space, said system having a combined surge inlet and outlet line terminating in the lower liquid space of said vessel and communicating with said pressurized liquid system, heating means for maintaining said liquid in said pressure vessel at a temperature different than the temperature of said liquid in said pressurized liquid system, a spray nozzle in the upper vapor space of said pressure vessel, and insurge container baffle disposed in said pressure vessel and comprising plate means forming a tube-like member open at opposite ends arranged co-axially about the end of said surge line, one end of said tube-like member surrounding the end of said surge line to form an annular flow passage therebetween and terminating between said end of said surge line and said pressure vessel, the opposite end of said tube-like member terminating subjacent said liquid level, and a second baffle means disposed within said tube-like member opposite the end of said surge line to dissipate the kinetic energy of the insurging fluid to inhibit its mixture with the fluid contained in said pressure vessel.

6. In a pressurized liquid system, a pressurizer comprising a pressure vessel adapted to contain a body of vaporizable liquid having a liquid level separating a lower liquid space from an upper vapor space, said system having a combined surge inlet and outlet line terminating in the lower liquid space of said vessel and communicating with said pressurized liquid system, heating means for maintaining said liquid in said pressure vessel at a temperature different than the temperature of said liquid in said pressurized liquid system, a spray nozzle in the upper vapor space of said pressure vessel, an insurge container baffle disposed in said pressure vessel and comprising plate means forming a tube-like member open at opposite ends arranged co-axially about the end of said surge line, one end of said tube-like member surrounding the end of said surge line to form a restricted anular flow passage therebetween and terminating between said ends of said surge line and said pressure vessel, the opposite end of said tube-like member terminating subjacent said liquid level, and a second baffle means disposed within said tube-like member opposite the end of said surge line to dissipate the kinetic energy of the insurging fluid to inhibit its mixture with the fluid contained in said pressure vessel.

7. In a pressurized liquid system, a pressurizer comprising a pressure vessel adapted to contain a body of vaporizable liquid having a liquid level separating a lower liquid space from an upper vapor space, said system having a combined surge inlet and outlet line terminating in the lower liquid space of said vessel and communicating with said pressurized liquid system, heating means for maintaining said liquid in said pressure vessel at a temperature different than the temperature of said liquid in said pressurized liquid system, a spray nozzle in the upper vapor space of said pressure vessel, an insurge container baffle disposed in said pressure vessel and comprising plate means forming a tube-like member open at opposite ends arranged co-axially about the end of said surge line, one end of said tube-like member surrounding the end of said surge line to form a restricted annular flow passage therebetween and terminating between said ends of said surge line and said pressure vessel, the opposite end of said tube-like member terminating subjacent said liquid level, and a second baffle means disposed within said tube-like member opposite the end of said surge line and forming an annular flow passage therebetween to dissipate the kinetic energy of the insurging fluid to inhibit its mixture with the fluid contained in said pressure vessel.

8. In a fluid system, a surge tank containing a body of fluid having a liquid level, said body of fluid being maintained at a temperature different than the temperature of the fluid in the fluid system, said system having a combined surge inlet and outlet line terminating in the lower portion of said tank and communicating with said fluid system, an insurge container baffle means disposed in said tank and comprising means forming a tube-like member open at opposite ends and arranged about the end of the surge line, one end of said tube-like member surrounding the end of said surge line and having an opening therethrough between the end of the surge line and said tank to provide liquid communication between the interior and exterior of said baffle means, said one end of said tube-like member cooperating with the end of said surge line to form a flow passage therebetween, the opposite end of said tube-like member terminating subjacent said liquid level, said baffle means arranged to dissipate the kinetic energy of the insurging fluid to inhibit its mixture with the fluid contained in said surge tank.

9. In a pressurized liquid system, a pressurizer comprising a pressure vessel adapted to contain a body of fluid having a liquid level separating a lower liquid space from an upper vapor space, said system having a combined surge inlet and outlet line terminating in the lower liquid space of said vessel and communicating with said pressurized liquid system, means for maintaining said liquid in said pressure vessel at a temperature different than the temperature of said liquid in said pressurized liquid system, an insurge container baffle means disposed in said pressure vessel and comprising means forming a tube-like member open at opposite ends and arranged about the end of the surge line, one end of said tube-like member surrounding the end of said surge line and having an opening therethrough between the end of the surge line and said pressure vessel to provide liquid communication between the interior and exterior of said baffle means, said one end of said tube-like member cooperating with the end of said surge line to form a flow passage therebetween, the opposite end of said tube-like member terminating subjacent said liquid level, said baffle means arranged to dissipate kinetic energy of the insurging fluid to inhibit its mixture with the fluid contained in said pressurizer.

References Cited by the Examiner
UNITED STATES PATENTS

| | | | |
|---|---|---|---|
| 2,099,914 | 11/37 | Waechter et al. | 137—592 |
| 2,207,057 | 7/40 | Gulick | 137—592 |
| 3,071,119 | 1/63 | Ammon et al. | 122—34 |

OTHER REFERENCES

"Proceedings of International Conference on the Peaceful Uses of Atomic Energy," Held in Geneva, 8 Aug.–20 Aug. 1955, vol. 3, page 221, published by United Nations, New York, 1955.

CHARLES SUKALO, *Primary Examiner*.

KENNETH W. SPRAGUE, *Examiner*.